US006941204B2

(12) United States Patent
Halm et al.

(10) Patent No.: US 6,941,204 B2
(45) Date of Patent: *Sep. 6, 2005

(54) SYSTEM AND METHOD FOR DIAGNOSING AIRCRAFT COMPONENTS FOR MAINTENANCE PURPOSES

(75) Inventors: Juergen Halm, Ganderkesee (DE); Kurt-Volker Hechtenberg, Brucksmuehl (DE); Werner Kolander, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/712,008

(22) Filed: Nov. 14, 2003

(65) Prior Publication Data

US 2004/0162651 A1 Aug. 19, 2004

Related U.S. Application Data

(63) Continuation of application No. 10/282,329, filed on Oct. 28, 2002.

(30) Foreign Application Priority Data

Oct. 27, 2001 (DE) .......................................... 101 53 151

(51) Int. Cl.$^7$ ........................... G06F 19/00; B64D 47/00
(52) U.S. Cl. ......................... 701/33; 701/3; 340/539.24
(58) Field of Search ............................ 701/29, 33, 34, 701/35, 3; 340/539.11, 539.24

(56) References Cited

U.S. PATENT DOCUMENTS

| 5,359,446 | A | * | 10/1994 | Johnson et al. | .............. 398/125 |
| 5,723,870 | A | * | 3/1998 | Crowne et al. | .............. 250/577 |
| 5,880,480 | A | * | 3/1999 | Ellinger et al. | .............. 250/577 |
| 5,969,260 | A | * | 10/1999 | Belk et al. | ...................... 73/773 |
| 6,009,356 | A | * | 12/1999 | Monroe | ........................ 701/14 |
| 6,292,108 | B1 | * | 9/2001 | Straser et al. | .......... 340/870.11 |
| 6,662,091 | B2 | * | 12/2003 | Wilson et al. | ................. 701/33 |
| 2002/0024450 | A1 | * | 2/2002 | Townsend et al. | ..... 340/870.16 |
| 2003/0083794 | A1 | | 5/2003 | Halm et al. | |
| 2003/0187554 | A1 | * | 10/2003 | Henry et al. | ................... 701/29 |
| 2003/0191564 | A1 | * | 10/2003 | Haugse et al. | ................ 701/29 |
| 2004/0078170 | A1 | * | 4/2004 | Di Marzio | .................... 702/14 |

* cited by examiner

Primary Examiner—Michael J. Zanelli
(74) Attorney, Agent, or Firm—Oblon, Spivak, McClelland, Maier & Neustadt, P.C.

(57) ABSTRACT

Aircraft maintenance and repair work is facilitated, especially for a commercial aircraft, by a diagnostic system and method, wherein an aircraft component or assembly of components is monitored by at least one sensor which produces and preferably also stores component status information. Respective status information signals are transmitted, preferably in a wireless manner, from a transmitter of the sensor to a receiver of a signal processing unit which provides status information on a display screen. The status information signals are preferably processed and evaluated with reference to rated maintenance and repair reference information to provide instructions as to what needs to be done where and when for a maintenance or repair. The sensor or sensors may operate during flight and the respective stored information is then processed and used on the ground.

61 Claims, 6 Drawing Sheets

SYSTEM AND METHOD FOR DIAGNOSING AIRCRAFT COMPONENTS FOR MAINTENANCE PURPOSES

This application is a continuation of U.S. application Ser. No. 10/282,329 filed Oct. 28, 2002, and is based on and claims the priority under 35 U.S.C. § 119 of German Patent Application 101 53 151.6, filed on Oct. 27, 2001, the entire disclosure of each of which are incorporated herein by reference.

BACKGROUND OF THE INVENTION

1. Field of the Invention

The invention relates to a method and apparatus for diagnosing the status of aircraft components or aircraft component assemblies to provide maintenance and repair information.

2. Background Information

It is customary to perform aircraft maintenance operations, particularly on commercial passenger aircraft, at predetermined, regular time intervals, whereby a multitude of maintenance checks must be performed. Such maintenance operations must be performed to assure the reliability and safety that is required for flight operations. Therefore, the components or component assemblies of individual aircraft types are regularly checked and/or replaced following a certain operating time duration. Due to the multitude and complexity of the aircraft components to be checked it is frequently time consuming and expensive to dismount the respective component then perform a fault check and testing of the functional capability of the particular component and then remount or reassemble the component or replace it by a new component or component assembly.

Another problem in connection with aircraft maintenance work is caused by possible faults that occur during flight but are not recognized during a check of the aircraft on the ground. Thus, the wear and tear of the actuators of the wing flap assemblies may, for example, be overlooked although such wear and tear in these flap actuators may be the cause that the entire aircraft begins to vibrate in response to control oscillations of the flap actuators. Such faults are hard to detect on the ground because these faults are normally not easily reproducible on the ground. It is difficult if not economically impossible to simulate actual flight conditions on the ground for maintenance purposes. Thus, a faulty flap actuator cannot conventionally be located with certainty. As a result, it is customary to replace even perfectly functional flap actuators for safety reasons. Such replacements involve substantial costs. Maintenance costs are a substantial proportion of the current costs of operating any commercial aircraft.

OBJECTS OF THE INVENTION

In view of the foregoing it is the aim of the invention to achieve the following objects singly or in combination:

to facilitate the maintenance of aircraft, particularly commercial aircraft, by a rapid and certain recognition and locating of faults in aircraft components or component assemblies so that replacement of components or component assemblies which are still perfectly operational is avoided;

to provide maintenance information and/or instructions to the maintenance personnel which enables the performance of the maintenance and repair work with a reduced effort and expense compared to the prior art while reducing the maintenance and repair time;

to sense and store status information of aircraft components during flight and then evaluate these status informations on the ground for maintenance and repair purposes; and to transmit sensed and stored component status information from the aircraft to a signal processing unit in a wireless manner so that maintenance personnel can perform a checking sequence without actually inspecting any particular component inside the aircraft.

SUMMARY OF THE INVENTION

The above objects have been achieved according to the invention by a diagnostic system for aircraft, particularly commercial aircraft comprising the following features. At least one sensor is positioned in or on an aircraft in a position for monitoring an aircraft component or component assembly to which the at least one sensor is allocated to provide status information signals regarding the operational status of the respective aircraft component or component assembly. A transmitter/receiver which is preferably part of a unit that also includes the sensor transmits the status information signals to a signal processing unit in response to interrogation signals from a separate unit that includes a receiver for receiving the status information signals for processing by the signal processing unit to provide maintenance and repair information. A display which preferably includes a display screen is operatively connected to the signal processing unit for displaying the maintenance and repair information. Preferably the sensing unit that includes the sensor and the transmitter/receiver, also comprises a memory for storing the status information signals, whereby these signals can be collected independently of any subsequent processing and evaluation of these status information signals. Preferably the signal processing unit with its computer, transmitter/receiver, and display forms a compact handset.

According to the invention there is also provided a method for providing aircraft maintenance information by performing the following steps:

(a) sensing in or on said aircraft an operational status of at least one aircraft component for providing component status information signals relevant to the operational status of said aircraft component, (b) transmitting said status information signals to a signal processing unit for processing to provide maintenance and repair information, and (c) displaying said maintenance and repair information on a display screen.

Preferably, the sensing step is combined with a storing step in which the status information signals are stored in a memory for subsequent transmission and processing to a separate, handheld unit.

It is a particular advantage of the invention that maintenance costs which constitute a substantial component of the current operating costs of a commercial aircraft, have been substantially reduced. These cost reductions are particularly due to the fact that the present system is capable of checking the aircraft components and/or component assemblies with certainty as to the presence and location of any faults in a substantially reduced time compared to prior art maintenance operations. Moreover, by providing the maintenance personnel with diagnostic information that is based on actual measured values even values measured during flight time, maintenance operations are facilitated by directly pointing out what needs to be done and exactly where. Further, by separating the information gathering from the information processing and evaluation, the maintenance operations are made simpler since maintenance personnel no longer needs to enter for example into the landing gear bay while still a precise locating of a fault or nonstandard condition is precisely located for example in a particular flap actuator or in the hydraulic system or in the fuel supply system of the aircraft.

The main advantage of the present method is seen in that faulty components and/or substandard situations are precisely pinpointed or located in the entire aircraft. The replacement of perfectly good components is avoided and the overall time for all maintenance and repair operations is substantially reduced compared to the prior art.

BRIEF DESCRIPTION OF THE DRAWINGS

In order that the invention may be clearly understood, it will now be described in connection with example embodiments, with reference to the accompanying drawings, wherein.

DETAILED DESCRIPTION OF A PREFERRED EXAMPLE EMBODIMENT AND OF THE BEST MODE OF THE INVENTION

Figure 1:
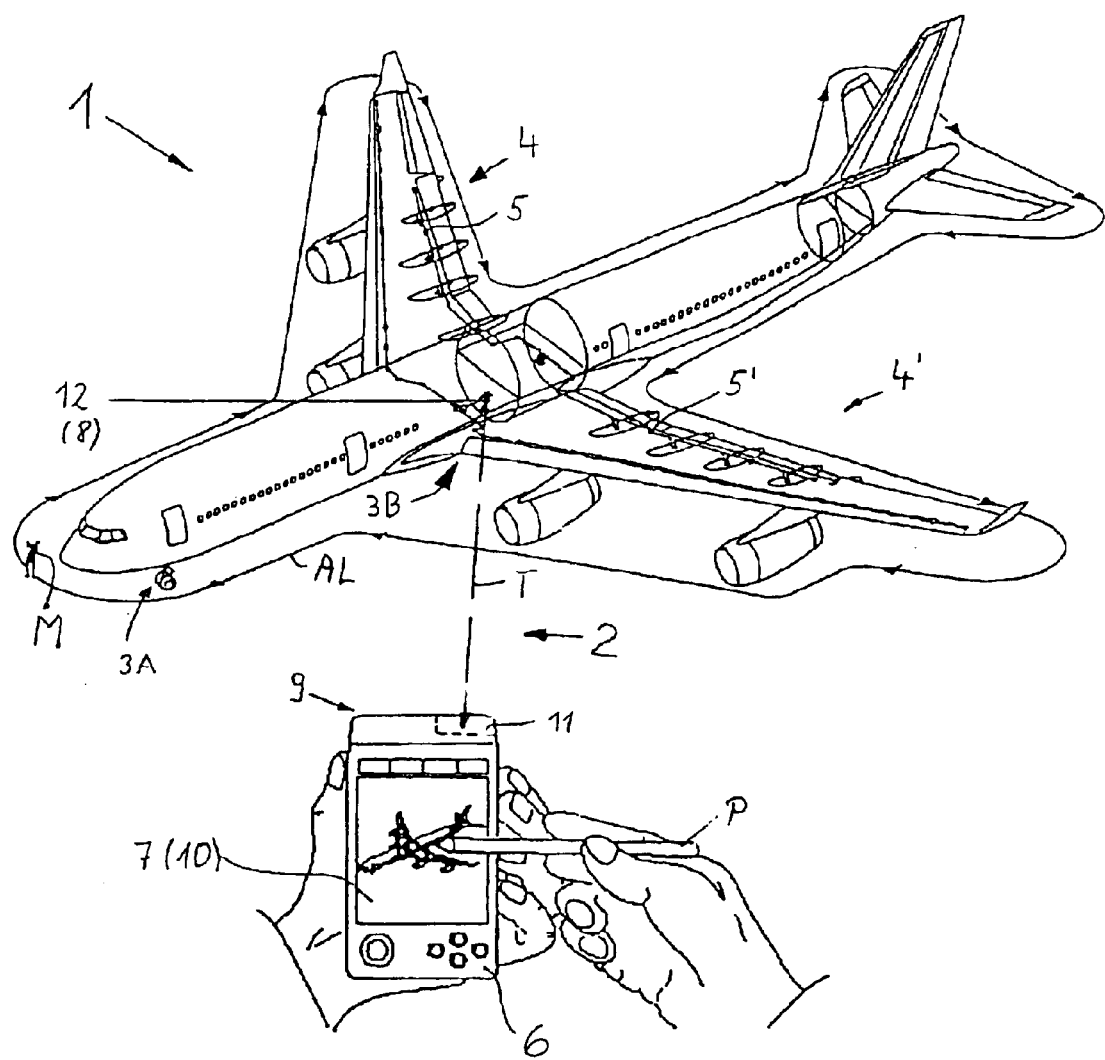
FIG. 1 shows schematically an aircraft on the ground and a pattern for a so-called "walk around check"

FIG. 1 shows schematically an outline of an aircraft 1 on the ground. The outline also shows examples of particular aircraft components or component assemblies to be monitored and diagnosed according to the invention. Prior to each flight it is required that a so-called "walk around check" is made by a mechanic who walks around the aircraft as indicated by the arrowed line AL. The purpose of such a check is to inspect the functional capability of important aircraft components and/or component assemblies. For example, the following components receive special attention, namely the front wheel assembly 3A, the landing wheels and gear 3B, including a check of the air pressure in the tires and a control of the brakes. Further, and among other checks, the flap assemblies 4 and 4' such as the spoiler and landing flaps and their hydraulic actuators 5, 5' of these flaps receive special attention. A problem with checking the flap assemblies 4 and 4' and the flap actuators 5 and 5' forming part of the wing, is the fact that these components are hard to access because these components are located in jumbo aircraft at an elevation of about 4 to 5 m above the tarmac level. Additionally the flap assemblies and their actuators are covered by conventional enclosures which also do not facilitate the accessability.

In order to simplify this "walk around check" the invention provides a maintenance person M with a handheld signal processing set 6 that is part of a diagnostic system 2 according to the invention and that permits communicating with at least one status sensor 8 individually provided for each component or component assembly to be monitored and diagnosed as will be described in more detailed below.

The handset 6 according to the invention comprises a display 7 with a display screen 10, a signal processing computer 9 and a wireless receiver transmitter 11. The computer 9 includes a memory that has stored therein the required maintenance information such as a checklist of items to be checked and steps to be performed. A set of diagnostic reference information is also stored in the memory of the computer 9. Any sensed signals or respective status informations also referred to as diagnostic information transmitted to the computer 9 is compared or evaluated relative to the diagnostic reference information. The mechanic can touch, for example, with a pencil P any particular coordinate point on the display screen 10 to thereby interrogate the respective sensor 8 which is, for example, positioned for monitoring a hydraulic container 12.

Preferably, the handset 6 is equipped with an exchangeable memory so that diagnostic reference information, as mentioned above, can be stored individually for different aircraft types. This feature of the present monitoring and checking system makes the system universally applicable to different types of aircraft.

In a further embodiment of the invention the handset 6 need not itself comprise a signal processing computer. Rather, the handset 6 could comprise a keyboard or at least the required number of operating keys or buttons, the display 7 and at least one transmitter-receiver 11. The signal processing unit in such an embodiment could be a separate computer such as a PC or a server that is appropriately linked to the handset 6, for example by a cable connection linking and interface in the handset 6 with the PC.

Each of the aircraft components or component assemblies is equipped with at least one sensor 8. For example, such sensors are provided at the hydraulic actuators 5 and 5'. Various conventional sensors can be used for the present purposes such as inductive sensors, capacitive sensors, magnetic sensors, infrared sensors, and the like. The sensors provided for monitoring the hydraulic actuators 5 and 5' must be capable of ascertaining actuator defects including wear and tear. The status information ascertained by the respective detectors can be gathered during flight and is then retrieved or interrogated during a ground check for processing and evaluation to provide the respective status information with regard to any particular flap actuator, whereby the respective information locates the corresponding actuator precisely in its position along the respective wing. The information is then, after processing and evaluation, displayed on the screen 10 of the handset 6 following transmission through a wireless transmission link T. The link can be a radio transmission link, an infrared transmission link, a laser transmission link or any other suitable transmission link. The transmitter receiver 11 that forms part of the handset 6 is constructed accordingly.

For example, the present system is suitable for ascertaining with the sensors 8 a water concentration, a particle concentration, and/or a filling level in a hydraulic system of the aircraft or in the fuel supply system of the aircraft as will be described in more detail below. The above mentioned monitoring of hydraulic actuators is another example. However, the invention is not limited to the examples. Any aircraft component or component assembly can be monitored and diagnosed in accordance with the present teaching.

The present system operates as follows. For checking the relevant aircraft component or component assembly during a ground maintenance operation. The mechanic touches a particular coordinate point on the display screen 10 whereby an interrogating signal is transmitted by the transmitter receiver 11 to the particular sensor 8, 8A, 8B, 8C for interrogating any status information stored in a memory of the respective sensor. For this purpose the sensor is also equipped with a transmitter receiver, not shown.

When the response is received, the signal processing unit 9 processes and evaluates the respective signal and provides a respective display on the screen 10, giving the mechanic M the information that he needs for performing the walk around check and any other required maintenance work. The wireless receiver of the transmitter receiver 11 provides its output to the signal processing unit 9, whereby the processing of the status informations could take place by conventional stationary computers. However, in a preferred embodiment the handset 6 itself includes a pocket personal computer or may be connected to a laptop computer. It is preferred that the computer 9 is part of the handset 6 because this feature facilitates the work of the mechanic in checking the aircraft components or component assemblies to ascertain with the diagnosis any faults in the aircraft and even more important, the precise location of the fault.

A signal transmission T from the transmitter receiver 11 to the transmitter receiver of the sensor 8 takes place in a wireless manner over a range or distance of at least 12 m. With such a capability, the handset 6 enables the mechanic M to avoid the problems that are posed by jumbo aircraft due to their substantial dimensions that make access to the wing flaps, for example, and their drive actuators difficult so that without auxiliary means such as a ladder or scaffold a direct check cannot be performed conventionally. The invention solves this problem with a high degree of reliability. As mentioned, the signal transmission from the receiver transmitter 11 to the receiver transmitter of the sensors 8 can be a radio transmission or an infrared transmission or a laser transmission. According to the invention the energy for producing the sensor signals and for transmitting the respective signals or information is provided individually for each sensor unit 8. Thus, the sensors are independent of any power supply of the aircraft, whereby it is assured that the integration of the sensors into the components or component assembly to be monitored does to depend on the operability of the aircraft's own power supply. Any connections to the aircraft power supply is also advantageously avoided. The energy supply for the sensors 8 can, for example be accomplished by separate energy sources such as batteries or energy storage devices such as solar energy converters. Preferably, the sensors 8 are energized by energy generators that convert energy taken from the surroundings. Such generators produce electricity by converting unavoidable vibrations occurring in an aircraft when the engines of the aircraft are running.

Figure 2:
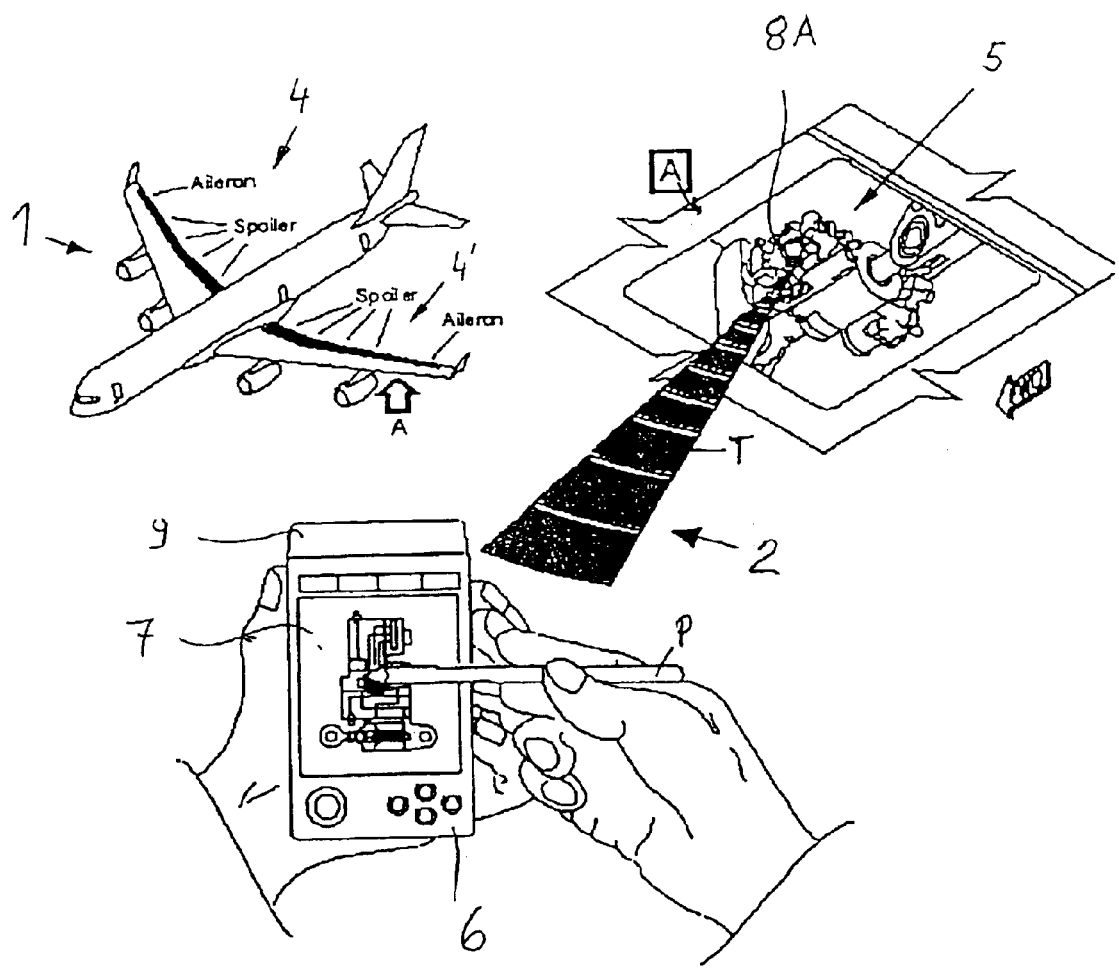
FIG. 2 illustrates an example embodiment of a diagnostic procedure for detecting a fault in flap actuators in a commercial aircraft.

FIG. 2 shows an example embodiment of the present diagnostic system as used for diagnosing the operational status of the actuators 5, 5' of the wing flap assemblies 4 and 4' of the aircraft 1. Numerous actuators 5, 5' are required for the operation of the wing flaps and the wear and tear of these actuators must be regularly checked. Such checks are required because the wear and tear on the spoiler actuators 5, 5' may, for example, lead to aircraft vibrations also known as so-called "slipping effect" which causes the entire aircraft to vibrate during specific flight phases in response to controlled oscillations of the respective flap actuators and flaps. This slipping effect occurs during flight and hence cannot be easily reproduced on the ground. Therefore, it is important to determine which actuators are faulty by the sensor 8A provided according to the invention individually for each actuator of the wing flaps or any other movable components in the aircraft structure such as movable tail components. According to the invention the sensors 8A are equipped with a memory not shown in which the sensed signals are stored during flight. In a preferred embodiment the sensors 8, 8A may be equipped with a computer module having a limited signal processing capability to provide a preliminary processing and evaluation of the respective status signals to thereby achieve a reduction in the data volume while simultaneously providing signals suitable for transmission to the receiver transmitter 11 of the handset 6.

FIG. 2 shows an enlarged illustration A of an aircraft spoiler actuator 5 equipped with a sensor 8A attached externally to the actuator 5. The sensor 8A is, for example, a piezoelectric sensor which produces a status signal in response to a mechanical pressure. It is also possible to use in addition to or instead of the piezoelectric sensor an acceleration sensor particularly where it is intended to diagnose a vibration or slipping effect. The parameters that are significant for ascertaining such slipping effect are, for example, hydraulic control pressure peaks or control piston oscillations. These parameters are sensed, stored, and if desired, a preliminary processing is performed so that only predetermined data or intermediate results are eventually evaluated in the computer 9 for providing the information required for performing a complete checking sequence. These preliminarily processed data or informations are stored and then transmitted to the processing unit 9 of the handset 6. The mechanic M can interrogate the display 7 with his pencil by touching the screen 10 in a coordinate point which will exactly pinpoint the location of the component to be diagnosed, whereupon the diagnosis information is displayed for the particular actuator 5 or 5'. Based on the received information the mechanic can decide with certainty whether due to the slipping effect any particular actuator, 5 or 5' needs to be replaced. The information provided to the mechanic identifies the exact location of any defect actuator so that the replacement is simplified and the replacement of a still properly functioning spoiler actuator is avoided. Heretofore it was necessary to remove an actuator from the aircraft, test it, and if it was still functional, to reinstall the particular actuator. This cumbersome operation of removing and reinstalling of aircraft components is avoided according to the invention.

Figure 3:
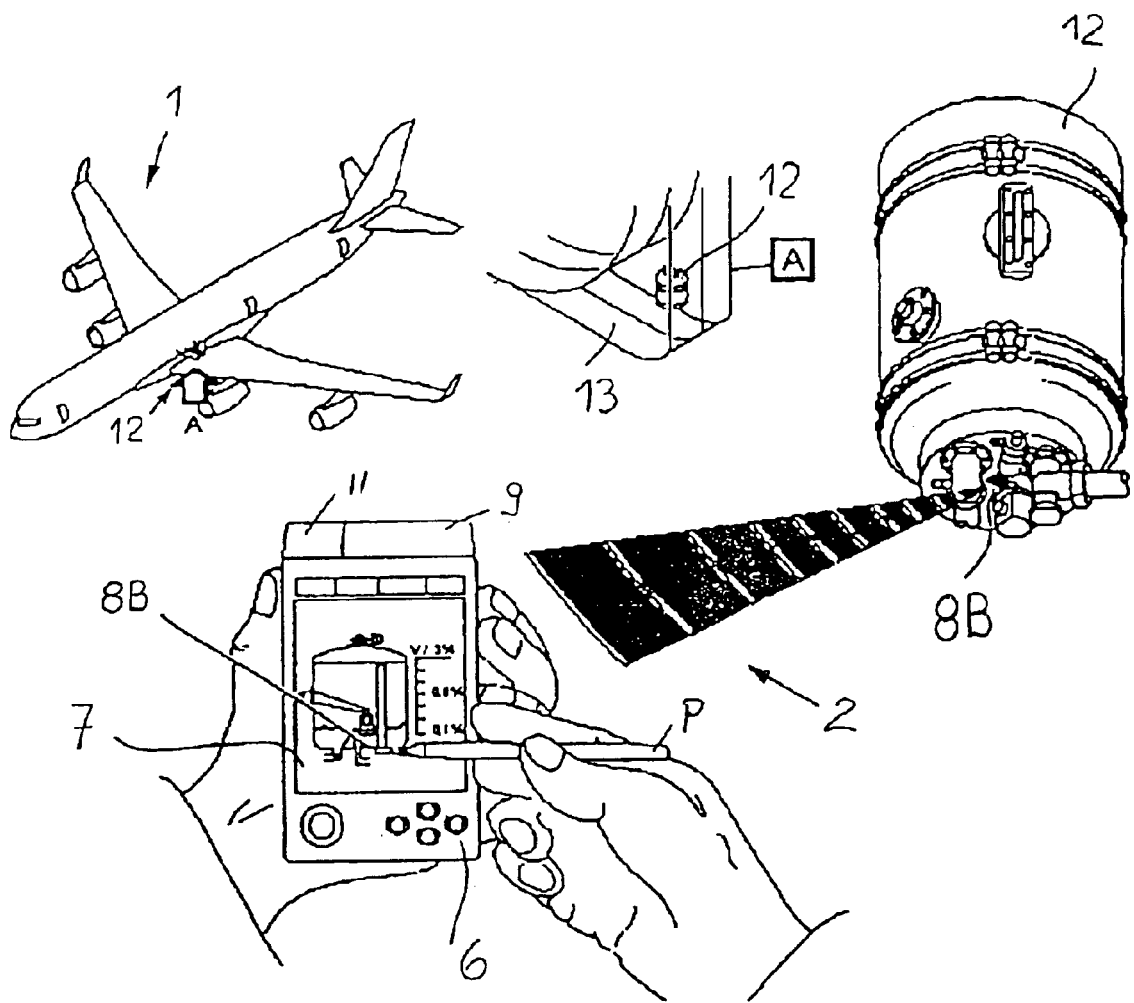
FIG. 3 illustrates an example embodiment for checking any water content in a hydraulic system of an aircraft.

FIG. 3 illustrates an embodiment of the present diagnostic system 2 in its application for monitoring the hydraulic assembly for the actuators in a commercial aircraft 1. A hydraulic container 12 needs to be monitored on a regular basis regarding any water content in the hydraulic liquid. This information is critical because any water content will, based on experience, substantially reduce the operational life of the hydraulic liquid. The hydraulic container 12 is, for example installed in the landing gear bay. Further, a high water content in the hydraulic liquid leads to damage of the entire hydraulic assembly. By ascertaining the status that includes, among others, the water content in the hydraulic fluid and/or the particle concentration in the hydraulic fluid, it becomes possible to early signalize, whether a cleaning or an exchange of the hydraulic liquid is necessary. A sensor 8B is installed at the bottom of the hydraulic container 12 for measuring the water content or rather the water concentration in the hydraulic container 12. The sensor 8B is equipped with a transmitter receiver of the type described above, but not shown in FIG. 3 for transmitting the respective information to the handset 6 in response to a touching of the display screen 10 of the display 7 by the mechanic with a pencil P or the like. The display will show the water content on a scale. This remote checking has the advantage that the mechanic does not need to climb into the landing gear bay for taking measurements directly at the hydraulic container 12.

Figure 4:
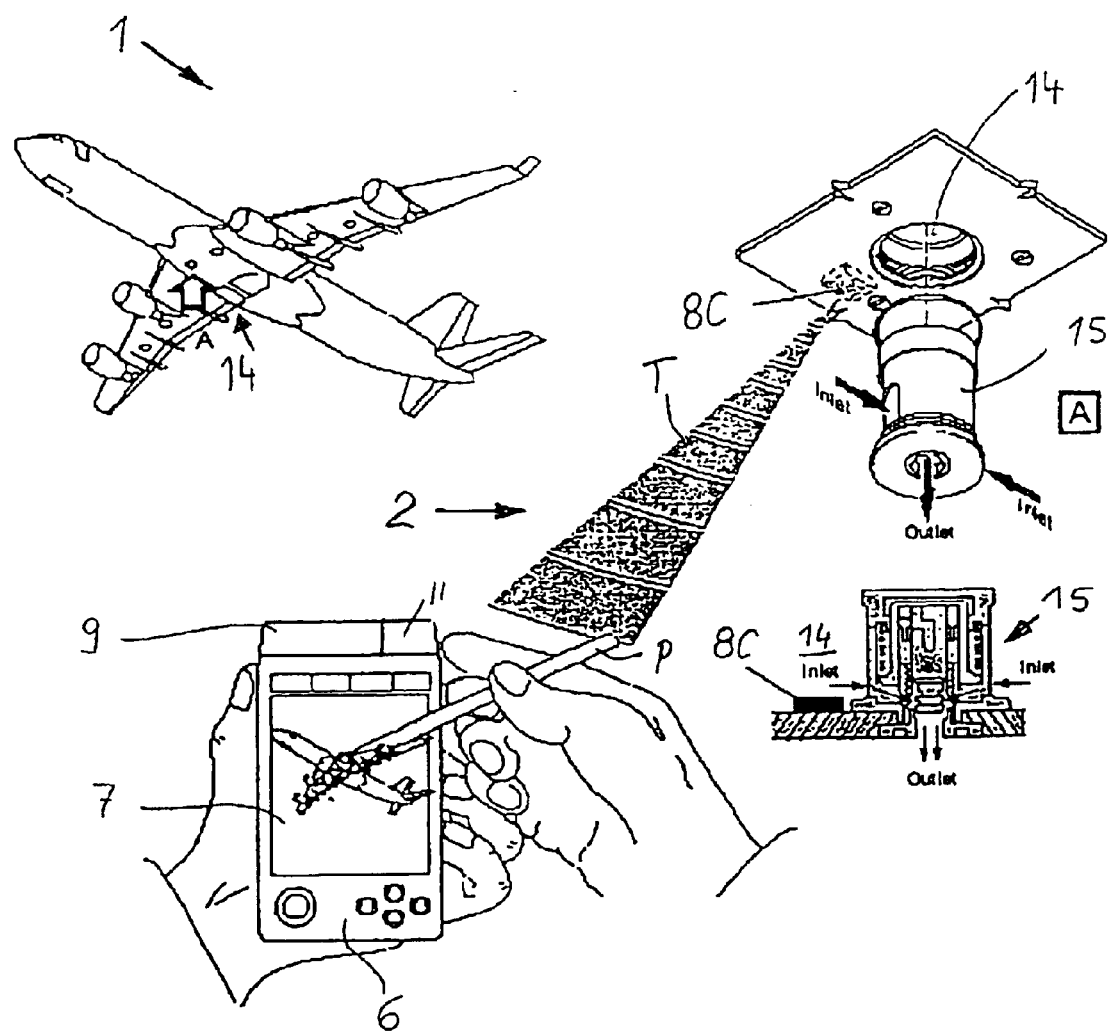
FIG. 4 illustrates an example embodiment for checking whether there is water present in the fuel within an aircraft fuel supply system.

FIG. 4 illustrates an example embodiment of the present diagnostic system 2 for checking the operational status of a fuel tank 14 in a commercial aircraft 1. It is necessary that any water accumulations in the tank 14 must be regularly removed through a water drainage valve 15. A fuel water detection sensor 8C is installed in the vicinity of the valve 15 within the tank 14 as taught by the invention. The sensor 8C is capable of sensing the presence and quantity of water at the bottom of the fuel tank. The sensor 8C is also equipped with a receiver transmitter and transmits the information or status signals to the processing unit 9 in the handset 6 in response to an interrogation initiated by the mechanic. The respective information informs the mechanic of the point of time when a water removal becomes necessary and this point of time is relatively precise so that repeated checkings are avoided and the drainage operation needs to be performed only when necessary as indicated on the screen 10 of the handset 6.

As in the other examples, a diagnostic sequence is initiated on the display 7 of the handset 6 and the sensed signal is then transmitted in response to an interrogation caused by touching the sensor symbol on the aircraft appearing on the display screen 10. The sensor 8C then transmits the information to the signal processing unit 9 which processes and evaluates the signals to provide the respective diagnosis information on the display screen. In addition to the measured value the display screen also provides whether a water drainage is necessary and precisely when it should be performed as mentioned above. Such maintenance information may differ for different aircraft. Therefore, it is preferred that the handset 6 is equipped with an exchangeable memory so that it may be used for different aircraft models.

In all example embodiments the sensed information is evaluated against a set of rated diagnostic information, by comparing, for indicating whether the sensed information relates to a properly working component or to a defective component. For example, in the case of the water check the measured result is compared to a practically permissible content of water in the fuel tank 14 or in the hydraulic container 12.

Figure 5:
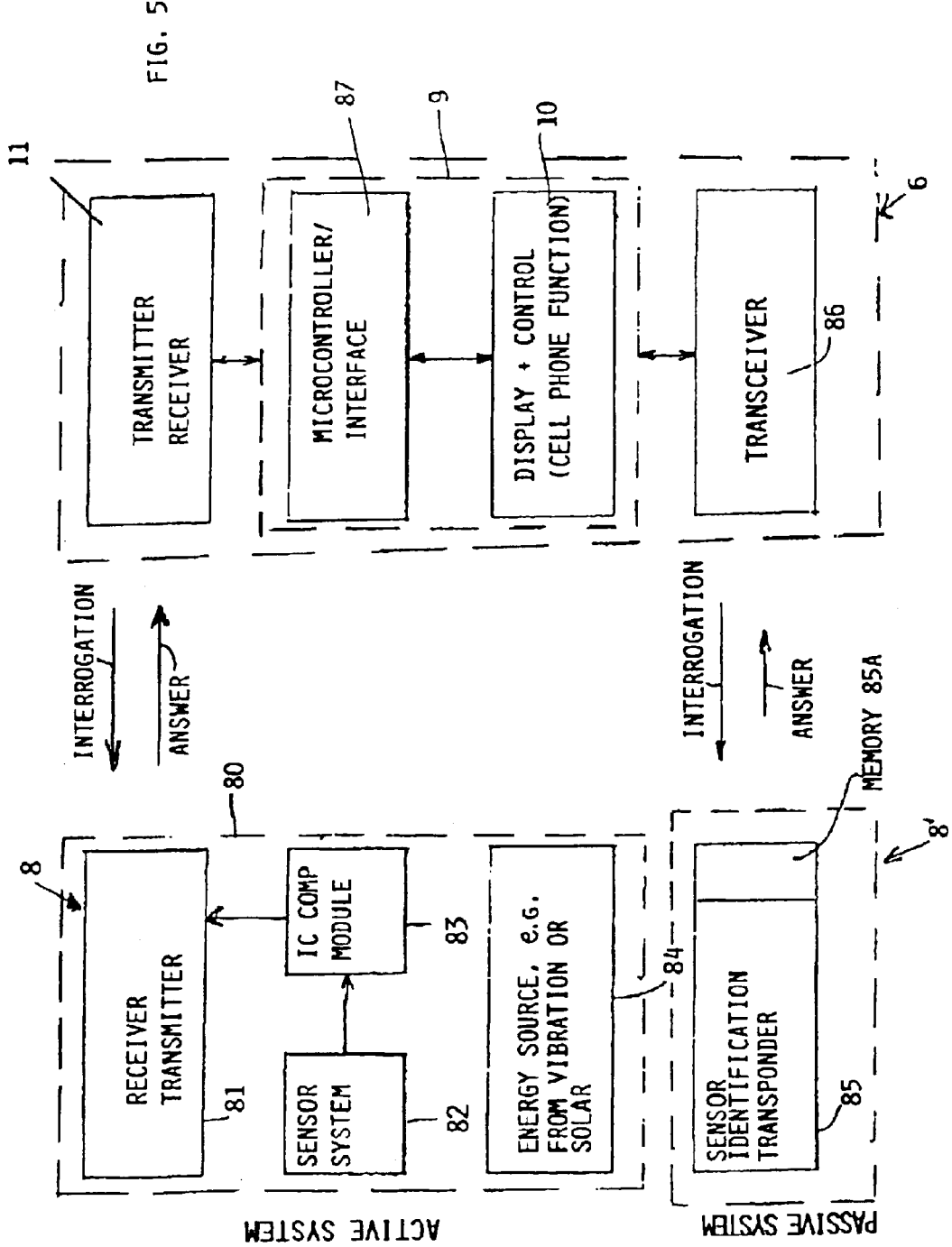
FIG. 5 is a block diagram of the present system showing a separate sensor unit with its components and a separate signal processing unit forming with its components a mobile handset.

FIG. 5 shows a block diagram of the present system. The left side illustrates four blocks 81, 82, 83, 84 that are part of the present sensor unit 8 as an active system. Block 81 is a first transmitter and a first receiver. Block 82 is at least one sensor such as the sensor 8A or 8B or 8C described above. Block 83 is a microprocessor and controller that includes an analog-to-digital converter and a time counter. The analog-to-digital converter receives its analog input signal from the sensor 82. Block 84 is a conventional power source for the blocks 81, 82 and 83. Thus, the blocks 81, 82 and 83 do not require any power from power sources of the aircraft. These blocks 81, 82, 83 and 84 form together an active wireless sensing and interrogating unit 80. The left side of FIG. 5 further shows an alternative passive sensor system 8', for example comprising a transponder 85 that provides a signal in response to an interrogation from the handset 6, for example a state sensor 8C, and further comprising a memory 85A.

The right side of FIG. 5 shows the mobile signal processing unit which in this embodiment is integrated into the mobile handset 6 including the active transmitter receiver 11, also shown in FIG. 1, a microcontroller interface or module 87, the display 10 and a controlling input keyboard, e.g. a touch screen 10 and control buttons and a transceiver 86 for getting a sensor response from the transponder 85.

The microcontroller interface or module 83 receives the component status signals from the sensor 82 and performs a preliminary signal processing, for example to make the signals received in analog form to be transmittable in digital form by the transmitter of the block 81 and/or for reducing the data volume to be transmitted to the receiver of the handset 6. The module 83 includes a time counter for determining whether a timely communication is taking place between the handset 6 and the sensor unit 8.

The microcontroller interface or module 87 forms with the display and touch screen 10 the signal processing unit 9 mentioned above. This unit 9 performs for example the following functions: indicating the progress of a diagnostic procedure, following the sending of an interrogation signal from the handset 6 to the sensor unit 8; registering or storing data and indicating information on the screen 10; exchanging data and instructions and/or displaying video repair instructions.

In addition to an active wireless communication of the handset 6 with the sensor unit 8 through the first transmitter and receiver 11 in the handset 6 and the second transmitter and receiver 81 in the sensor unit 8, a passive response by the transponder 85 to an interrogation by the transceiver 86 of the handset 6 is provided. This passive response may be used for several short distance purposes, for example, for identifying and/or requesting 1-bit-sensors 8C, etc.

The link established between the handset 6 and the sensor unit 8' by the transceiver 86 and the passive transponder 85 may also perform functions other than an identification function. Such other functions may include, for example, the checking of the tire pressure. For this purpose the transceiver 86 in the handset 6 activates the transponder 85 by a radio frequency signal to perform an interrogation at a very close range, for example less than 0.1 m, whereby the mechanic M holds the handset 6 close to a sensor in or at an aircraft wheel. For such measurement the passive transponder 85 can use the energy of the received interrogation signal for responding so that the sensor unit 8 does not have to expend energy for these passive responses by the transponder 85. This applies to all responses by the transponder 85 to interrogations from the transceiver 86.

According to the invention the above mentioned memory 85A of the transponder 85 may also be used for actively storing status information sensed by the sensor 82. The energy required for this purpose may be very small. The retrieval of the status information from the memory 85A of the transponder 85 takes place in response to an interrogation from the transceiver 86 in the handset 6. Here again the transponder 85 can use the energy of the interrogating signal from the transceiver 86 for the response. The passive transponder 85 and the transceiver 86 need not be radio frequency components. Instead, optical components including infrared components may be used just as for the first and second transmitter and receivers 11 and 81.

Figure 6:
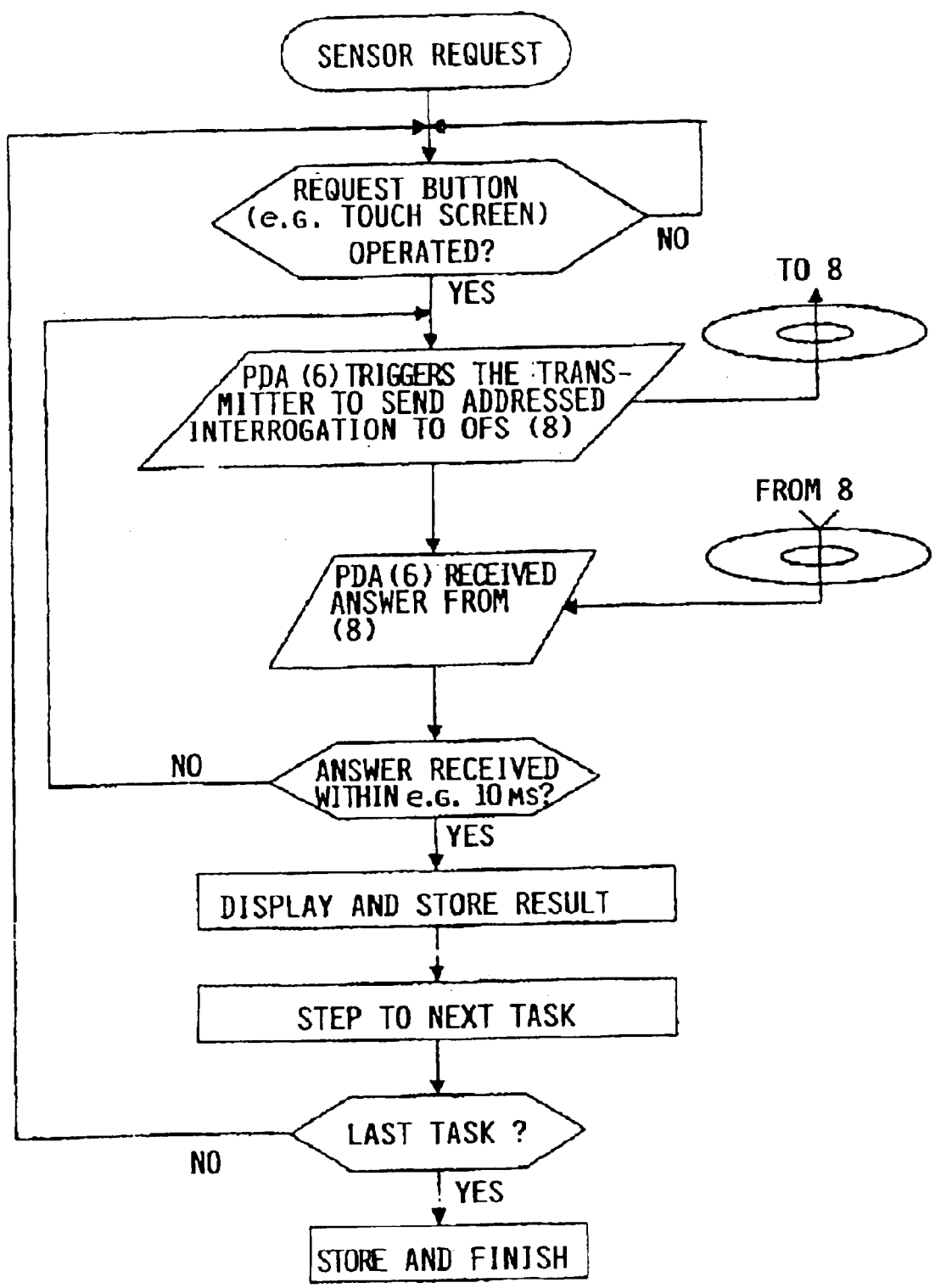
FIG. 6 is a flow diagram illustrating a diagnostic interrogation.

FIG. 6 illustrates the sequential steps performed by the present system in response to a diagnosis interrogation initiated for example by touching a specific point on the touch screen 10 as shown in FIG. 1, whereby the touch screen or rather its various coordinate points operate as a request button. The touch screen may be part of the handset 6 as shown or it may be part of a personal digital assistant (PDA). The touch initiates the interrogation signal transmitted by the first transmitter-receiver 11 in the handset 6 to the second receiver-transmitter 81 in the sensor unit 8 also referred to as on-flight-system (OFS). If the OFS does not provide a timely answer, for example within 10 ms, the interrogation is automatically repeated. If a timely answer is received, the respective status information signals from the sensor 82 are processed by the signal processing unit 9. The processing results are stored in a memory of the unit 9 and/or displayed in the screen 10. Then the sequential interrogation of other sensors may be continued as described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for diagnosing an aircraft component or component assembly for maintenance and repair purposes, said system comprising:
   (a) means positioned in or on said aircraft for monitoring an aircraft component and for providing status information signals regarding the status of said aircraft component,
   (b) first means for transmitting said status information signals and first means for receiving interrogation signals,
   (c) means for processing including second means for transmitting said interrogation signals and second means for receiving said status information signals for processing to provide maintenance and repair information, and
   (d) means for displaying said maintenance and repair information,
   wherein said means for monitoring comprises means for storing said status information signals sensed during flight for evaluation by said means for processing on the ground.

2. The system of claim 1, further comprising means for generating energy for said means for monitoring, wherein said means for generating energy comprises means for converting energy taken from surroundings of said means for generating energy.

3. A system for diagnosing an aircraft component or component assembly for maintenance and repair purposes, said system comprising:
   (a) means positioned in or on said aircraft for monitoring an aircraft component and for providing status information signals regarding the status of said aircraft component,
   (b) means for generating energy for said means for monitoring, wherein said means for generating energy comprises means for converting energy taken from surroundings of said means for generating energy,
   (c) first means for transmitting said status information signals and first means for receiving interrogation signals,
   (d) means for processing including second means for transmitting said interrogation signals and second means for receiving said status information signals for processing to provide maintenance and repair information, and
   (e) means for displaying said maintenance and repair information,
   wherein said means for monitoring comprises means for storing said status information signals sensed during flight for evaluation by said means for processing on the round.

4. The system of claim 3, wherein said means for monitoring comprises means for preliminary processing of said status information signals to provide transmittable signals to said first means for transmitting in response to said interrogation signals from said second means for transmitting.

5. The system of claim 3, wherein said means for monitoring comprises its own means for operating independently of any aircraft power source.

6. The system of claim 3, wherein said means for monitoring and said means for processing are separate, wherein said first means for transmitting and first means for receiving are part of said separate means for monitoring, and wherein said second means for transmitting and said second means for receiving are part of said separate means for processing.

7. The system of claim 6, wherein said first and second means for transmitting and receiving are respectively wireless transmitters and wireless receivers.

8. The system of claim 6, wherein said first and second means for transmitting and receiving are respectively infrared transmitters and infrared receivers.

9. The system of claim 3, wherein said means for processing comprises means for determining, on the basis of said status information signals, the presence or absence of a fault in said aircraft component, said means including rated reference information.

10. The system of claim 3, wherein said means for display displays said maintenance and repair information and for pinpointing any particular aircraft component to be diagnosed.

11. The system of claim 3, wherein said means for processing and said means for displaying together form a handset.

12. The system of claim 3, wherein said means for monitoring is positioned for sensing wear and tear of a wing flap actuator and for providing a respective actuator status information signal.

13. The system of claim 3, wherein said means for monitoring is positioned in a bottom area of a hydraulic container in said aircraft for sensing a quality of a hydraulic fluid in said hydraulic container.

14. The system of claim 3, wherein said means for monitoring is positioned in an aircraft fuel tank in an area of a water drainage valve for sensing a water concentration or content in said fuel tank.

15. The system of claim 3, further comprising means for linking transmission between said means for monitoring and said means for processing.

16. The system of claim 3, wherein said means for generating energy comprises solar energy converters.

17. The system of claim 3, wherein said means for generating energy comprises means for converting vibrations occurring in said aircraft.

18. A system for diagnosing an aircraft component or component assembly for maintenance and repair purposes, said system comprising:
   (a) means positioned in or on said aircraft for monitoring an aircraft component and for providing status information signals regarding the status of said aircraft component,
   (b) first means for transmitting said status information signals and first means for receiving interrogation signals,
   (c) means for processing including second means for transmitting said interrogation signals and second means for receiving said status information signals for processing to provide maintenance and repair information, and
   (d) means for displaying said maintenance and repair information,
   wherein said means for processing comprises means for storing therein rated maintenance and repair reference information for evaluating said status information signals with reference to said rated maintenance and repair reference information.

19. The system of claim 18, further comprising means for generating energy for said means for monitoring, wherein said means for generating energy comprises means for converting energy taken from surroundings of said means for generating energy.

20. A method for diagnosing an aircraft component or component assembly for maintenance and repair purposes, said method comprising:
  (a) generating energy during flight by converting energy taken from surrounding of a sensor,
  (b) using said energy, a step of sensing with said sensor on said aircraft an operational status of at least one aircraft component during flight for providing component status information signals relevant to said at least one aircraft component,
  (c) transmitting an interrogation signal to request said component status information signals generated in said sensing (b),
  (d) transmitting said status information signals to a signal processing unit for processing to provide maintenance and repair information, and
  (e) displaying said maintenance and repair information on a display screen.

21. The method of claim 20, further comprising preliminarily processing said status information signals in a signal processing module in a sensor unit for data reduction and for producing intermediate signals that represent said status information signals.

22. The method of claim 20, comprising performing said transmitting in a wireless manner.

23. The method of claim 20, comprising storing in a memory of said signal processing unit rated maintenance and repair reference information, and evaluating said status information signals with reference to said rated maintenance and repair reference information.

24. The method of claim 23, further comprising said sensing and sorting during flight and then performing said transmitting, processing, evaluating, and displaying while said aircraft is on the ground.

25. The method of claim 20, further comprising storing said status information signals in a memory prior to said processing.

26. A system for diagnosing an aircraft component or component assembly for maintenance and repair purposes, said system comprising:
  (a) means positioned in or on said aircraft for monitoring a wing flap component and for providing status information signals regarding the status of said wing flap component,
  (b) first means for transmitting said status information signals and first means for receiving interrogation signals,
  (c) means for processing including second means for transmitting said interrogation signals and second means for receiving said status information signals for processing to provide maintenance and repair information, and
  (d) means for displaying said maintenance and repair information,
  wherein said means for processing comprises means for storing therein rated maintenance and repair reference information for evaluating said status information signals with reference to said rated maintenance and repair reference information.

27. The system of claim 26, wherein said means for monitoring comprises means for preliminary processing of said status information signals to provide transmittable signals to said first means for transmitting in response to said interrogation signals from said second means for transmitting.

28. The system of claim 26, wherein said means for monitoring comprises its own means for operating independently of any aircraft power source.

29. The system of claim 26, wherein said means for monitoring and said means for processing are separate, wherein said first means for transmitting and first means for receiving are part of said separate means for monitoring, and wherein said second means for transmitting and said second means for receiving are part of said separate means for processing.

30. The system of claim 29, wherein said first and second means for transmitting and receiving are respectively wireless transmitters and wireless receivers.

31. The system of claim 29, wherein said first and second means for transmitting and receiving are respectively infrared transmitters and infrared receivers.

32. The system of claim 26, wherein said means for processing comprises means for determining, on the basis of said status information signals, the presence or absence of a fault in said wing flap component, said means including rated reference information.

33. The system of claim 26, wherein said means for display displays said maintenance and repair information and for pinpointing any particular wing flap component to be diagnosed.

34. The system of claim 26, wherein said means for processing and said means for displaying together form a handset.

35. The system of claim 26, wherein said means for monitoring is positioned for sensing wear and tear of a wing flap actuator and for providing a respective actuator status information signal.

36. The system of claim 26, further comprising means for linking transmission between said means for monitoring and said means for processing.

37. A system for diagnosing an aircraft component or component assembly for maintenance and repair purposes, said system comprising:
  (a) means positioned in or on said aircraft for monitoring a wing flap component and for providing status information signals regarding the status of said wing flap component,
  (b) first means for transmitting said status information signals and first means for receiving interrogation signals,
  (c) means for processing including second means for transmitting said interrogation signals and second means for receiving said status information signals for processing to provide maintenance and repair information, and
  (d) means for displaying said maintenance and repair information,
  wherein said means for monitoring comprises means for storing said status information signals sensed during flight for evaluation by said means for processing on the ground.

38. A method for diagnosing an aircraft component or component assembly for maintenance and repair purposes, said method comprising:
  (a) a step of sensing in or on said aircraft an operational status of at least one wing flap component for providing component status information signals relevant to said at least one wing flap component, (b) transmitting an interrogation signal to request said component status information signals generated in said sensing (a), (c) transmitting said status information signals to a signal processing unit for processing to provide maintenance and repair information, and (d) displaying said maintenance and repair information on a display screen, further comprising performing said sensing whether said aircraft is on the around or in flight and performing said transmitting, processing, and displaying while said aircraft is on the ground.

39. The method of claim 38, further comprising preliminarily processing said status information signals in a signal processing module in a sensor unit for data reduction and for producing intermediate signals that represent said status information signals.

40. The method of claim 38, comprising performing said transmitting in a wireless manner.

41. The method of claim 38, comprising storing in a memory of said signal processing unit rated maintenance and repair reference information, and evaluating said status information signals with reference to said rated maintenance and repair reference information.

42. The method of claim 38, further comprising storing said status information signals in a memory prior to said processing.

43. A system for diagnosing aircraft component or component assembly for maintenance and repair purposes, said system comprising:

(a) means positioned in or on said aircraft for monitoring a hydraulic component and for providing status information signals regarding the status of said hydraulic component, (b) first means for transmitting said status information signals and first means for receiving interrogation signals, (c) means for processing including second means for transmitting said interrogation signals and second means for receiving said status information signals for processing to provide maintenance and repair information, and (d) means for displaying said maintenance and repair information.

44. The system of claim 43, wherein said means for monitoring comprises means for preliminary processing of said status information signals to provide transmittable signals to said first means for transmitting in response to said interrogation signals from said second means for transmitting.

45. The system of claim 43, wherein said means for monitoring comprises its own means for operating independently of any aircraft power source.

46. The system of claim 43, wherein said means for monitoring and said means for processing are separate, wherein said first means for transmitting and first means for receiving are part of said separate means for monitoring, and wherein said second means for transmitting and said second means for receiving are part of said separate means for processing.

47. The system of claim 46, wherein said first and second means for transmitting and receiving are respectively wireless transmitters and wireless receivers.

48. The system of claim 46, wherein said first and second means for transmitting and receiving are respectively infrared transmitters and infrared receivers.

49. The system of claim 43, wherein said means for processing comprises means for determining, on the basis of said status information signals, the presence or absence of a fault in said hydraulic component, said means including rated reference information.

50. The system of claim 43, wherein said means for monitoring comprises means for storing said status information signals sensed during flight for evaluation by said means for processing on the ground.

51. The system of claim 43, wherein said means for processing comprises means for storing therein rated maintenance and repair reference information for evaluating said status information signals with reference to said rated maintenance and repair reference information.

52. The system of claim 43, wherein said means for display displays said maintenance and repair information and for pinpointing any particular hydraulic component to be diagnosed.

53. The system of claim 43, wherein said means for processing and said means for displaying together form a handset.

54. The system of claim 43, wherein said means for monitoring is positioned in a bottom area of a hydraulic container in said aircraft for sensing a quality of a hydraulic fluid in said hydraulic container.

55. The system of claim 43, further comprising means for linking transmission between said means for monitoring and said means for processing.

56. A method for diagnosing an aircraft component or component assembly for maintenance and repair purposes, said method comprising:

(a) a step of sensing in or on said aircraft an operational status of at least one hydraulic component for providing component status information signals relevant to said at least one hydraulic component, (b) transmitting an interrogation signal to request said component status information signals generated in said sensing (a), (c) transmitting said status information signals to a signal processing unit for processing to provide maintenance and repair information, and (d) displaying said maintenance and repair information on a display screen.

57. The method of claim 56, further comprising preliminarily processing said status information signals in a signal processing module in a sensor unit for data reduction and for producing intermediate signals that represent said status information signals.

58. The method of claim 56, comprising performing said transmitting in a wireless manner.

59. The method of claim 56, comprising storing in a memory of said signal processing unit rated maintenance and repair reference information, and evaluating said status information signals with reference to said rated maintenance and repair reference information.

60. The method of claim 59, further comprising performing said sensing whether said aircraft is on the ground or in flight and performing said transmitting, processing, evaluating, and displaying while said aircraft is on the ground.

61. The method of claim 56, further comprising storing said status information signals in a memory prior to said processing.

* * * * *